May 9, 1933.   C. F. INGOLD   1,908,480
OPHTHALMIC MOUNTING
Filed April 7, 1928
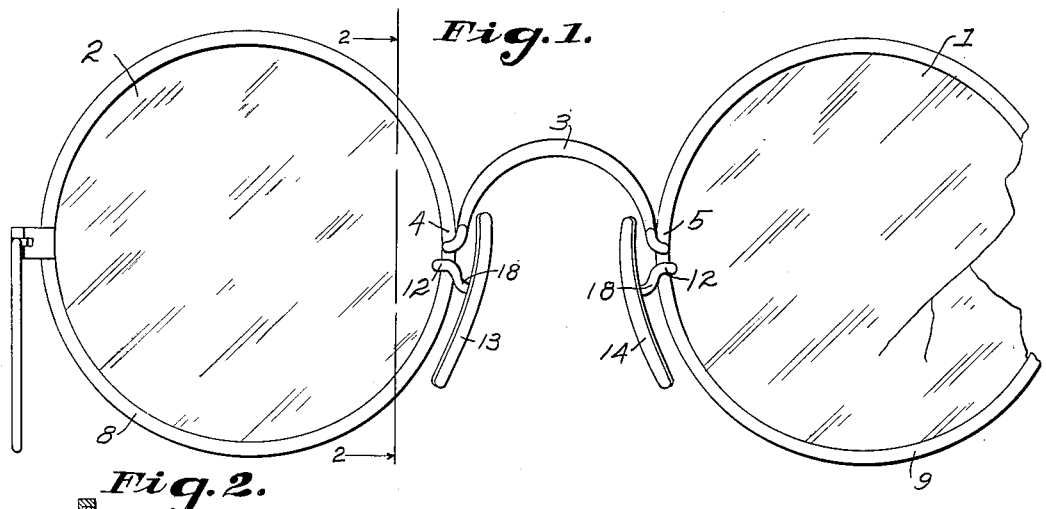
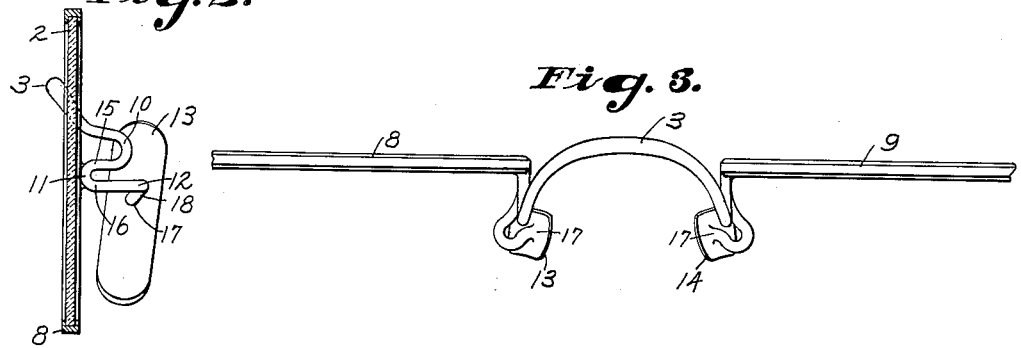
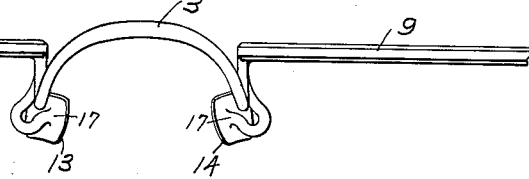
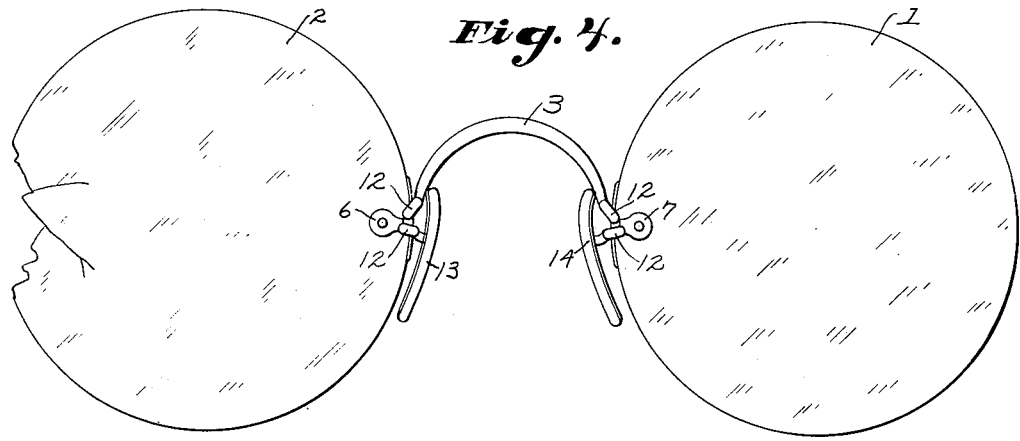
INVENTOR.
Carl F. Ingold
BY
Erwin, Wheeler & Woolard
ATTORNEYS Patented May 9, 1933

1,908,480

UNITED STATES PATENT OFFICE

CARL F. INGOLD, OF WAUWATOSA, WISCONSIN, ASSIGNOR TO THE MILWAUKEE OPTICAL MFG. CO., OF MILWAUKEE, WISCONSIN, A CORPORATION OF WISCONSIN

OPHTHALMIC MOUNTING

Application filed April 7, 1928. Serial No. 268,122.

My invention relates to improvements in ophthalmic mountings.

The problem in forming a nose pad and bridge mounting in ophthalmic structures lies in the formation of curves and terminals of the spring members comprising such structures so as to minimize possibility of crystallization without sacrificing the particular spring quality desired in the particular member.

The object of my invention is to provide a mounting wherein the required amount of flexibility and resiliency is maintained without danger of crystallization and wherein the danger of snapping a spring member in adjusting the mounting to the nose of the wearer is reduced to the minimum.

More particularly stated, it is the object of my invention to provide a bridge for an ophthalmic mounting for lenses and nose pads upon a unitary adjustable structure which may be expanded or contracted, raised or lowered, or retracted or advanced respectively by separate adjustments of reverse curves of loops of material from which the mounting is formed.

Another object of my invention is to provide a cheap unitary bridge and nose pad unit which will be easy of manufacture.

In the drawing:

Figure 1 is an elevation of a pair of spectacles provided with my improved nose piece.

Figure 2 is a section taken on line 2—2 of Figure 1.

Figure 3 is a plan view of the pair of spectacles shown in Figure 1.

Figure 4 is an elevation similar to Figure 1 and showing the attachment of my device to a rimless pair of spectacles.

Like parts are identified by the same reference characters throughout the several views.

I have found through repeated tests of ophthalmic mountings that the gold or silver wire used for the purpose must necessarily be curved and so formed that constant flexion of the various parts not only in the original adjustment of the complete mounting, but also in daily use by the wearer must be provided for to the end that crystallization will be avoided. I have, therefore, devised a novel construction wherein the wire forming the bridge and nose pad support and obviously the support likewise for the spectacle lenses or spectacle lens frames, is formed as shown in the drawing, wherein the usual lenses 1 and 2 are spaced apart and sufficiently rigidly secured by the bridge wire 3 curved in a graceful arc between the margins 4 and 5 of the lens frames as shown in Figure 1, or between the lens mountings 6 and 7 as shown in Figure 4, wherein the lenses are shown devoid of a complete frame such as that provided at 8 and 9 in the spectacles shown in Figure 1.

It is to be noted that the bridge wire 3 is substantially thicker in its broad arch than it is where it develops in its arc at either end into a series of curves which may best be described as reversed curves 10, 11 and 12, the curve 10 being directed backwardly toward the head of the wearer, the curve 11 being directed forwardly toward the spectacle lenses and the curve 12 developing inwardly toward the nose of the wearer and terminating in a nose pad 13 or 14.

Each of the reverse curves 10, 11 and 12 is adapted to perform a definite function in the provision of adjustability in the general structure of my ophthalmic mounting. The curve 10 provides ample range of adjustment through slight bending thereof so that the arc of the bridge 3 may be changed to conform to the facial characteristics of a proposed wearer. The curve 11 as shown most distinctly in Figure 2 provides substantial area for soldering or otherwise securing the lens mountings to the bridge wire and at the same time provides in its further reaches 15 and 16 sufficient extent for adjustment through bending of the wire material so that the nose pads 13 or 14 may be raised or lowered in reference to the general position of the lenses 1 and 2 without danger of crystallization and at the same time provides in the portions 15 and 16 sufficient resilience to make my ophthalmic mounting comfortable to the wearer.

The reverse curve 12 and the extension thereof into an abrupt terminal at 17 provides resilience and adjustability for the nose pads 13 and 14 in a lateral direction and by reason of the particular method of attachment of the nose pads 13 and 14 to this abrupt terminal of the bridge wire 3, I have provided a much more permanent and substantial construction in nose pad mountings.

Despite an apparent minimum of attaching material, I have found that by abutting the square end of bridge wire 3 against the broad outer face of the nose pads 13 or 14 and soldering or otherwise amalgamating the metals of the wire and nose pad, a much more substantial and permanent attachment is produced than may be produced by any of the other heretofore accepted methods of attaching such nose pads.

It will be noted that the curves 10 and 11 are in substantially the same plane and that that plane is approximately vertical, while the curve 12 is in a plane substantially horizontal, but at the same time provided with a small offset at 18 to provide still greater resilience.

It will further be noted that by curving a single bridge wire into a series of reverse folds as disclosed herein, I have provided in a simple manner for a cheap and graceful ophthalmic mounting which may be easily made, adjusted and comfortably worn by any wearer.

I claim:

1. An ophthalmic mounting comprising a member arched to provide a bridge and extending thence rearwardly at each side of the bridge, the adjacent portions of said member being bent forwardly upon themselves approximately in a vertical plane and thence bent reversely rearwardly approximately in a vertical plane, and the extremities of said member being bent forwardly approximately in a horizontal plane upon themselves and turned inwardly, together with nose pads secured to the inwardly directed extremity.

2. An ophthalmic mounting comprising a member arched to provide a bridge and extending thence rearwardly at each side of the bridge, the adjacent portions of said member being bent forwardly upon themselves approximately in a vertical plane and thence bent reversely rearwardly approximately in a vertical plane, and the extremities of said member being bent forwardly approximately in a horizontal plane upon themselves and turned inwardly, together with nose pads secured to the inwardly directed extremity, and lens straps secured to the central portions of the respective reverse bends aforesaid.

3. An ophthalmic mounting comprising a flexibly adjustable member centrally arched to provide a bridge and extended at each side thence rearwardly and provided with curves forwardly upon itself, and reverse bends downwardly and rearwardly from its forwardly projecting portions, in combination with lens straps secured only at their sides to the central portions of the respective reverse bends of said member, and pads secured to the ends of said member, the portions of said member between the reverse bends therein and the respective pads extending rearwardly and outwardly, bent upon themselves in a forward and inward direction substantially in a horizontal plane and thence extending downwardly and inwardly to their respective terminals connected in end abutment with said pads.

4. An ophthalmic mounting comprising a member provided intermediate its ends with a bridge portion and having flexible adjustable portions extended at each side of said bridge portion rearwardly, thence downwardly and rearwardly in a curve providing strap anchorages and thence rearwardly to provide pad mounting arms, in combination with lens straps secured only at their sides to the aforesaid curves, and pads secured to said arms.

CARL F. INGOLD.